UNITED STATES PATENT OFFICE.

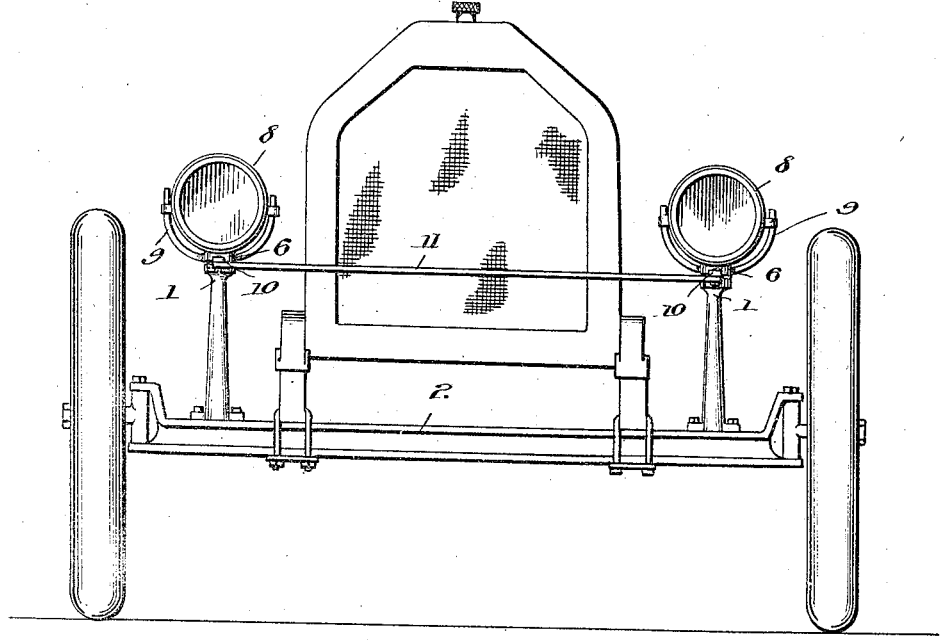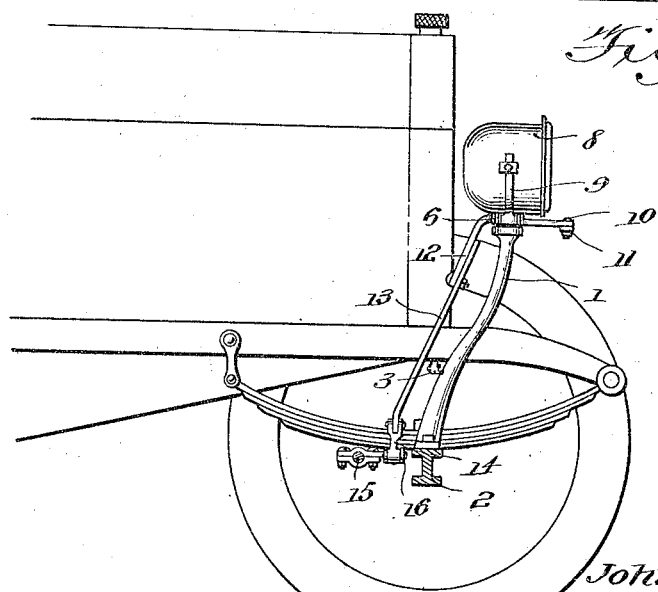

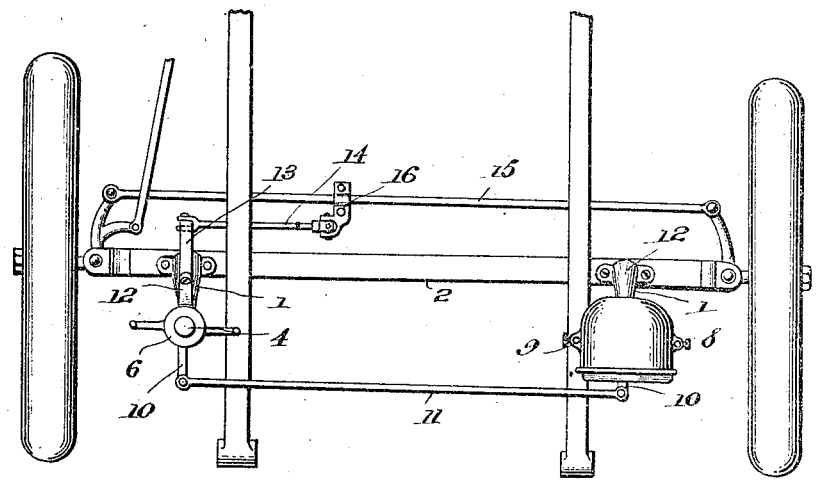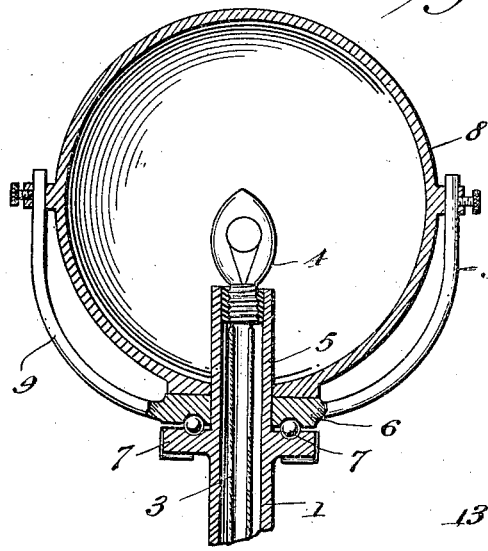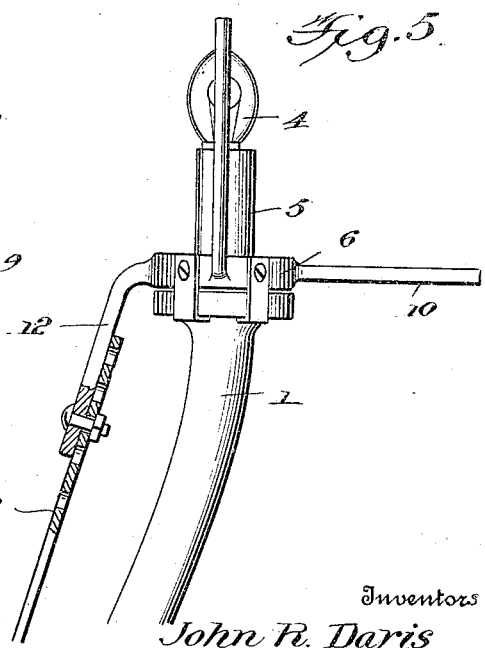

JOHN R. DAVIS AND ULLIE M. RICHARDSON, OF VINE GROVE, KENTUCKY, ASSIGNORS TO REX REVOLVING LIGHT COMPANY, INC., OF VINE GROVE, KENTUCKY, A CORPORATION OF KENTUCKY.

HEADLIGHT.

1,141,780.   Specification of Letters Patent.   Patented June 1, 1915.

Application filed March 10, 1914. Serial No. 823,831.

*To all whom it may concern:*

Be it known that we, JOHN R. DAVIS and ULLIE M. RICHARDSON, citizens of the United States, residing at Vine Grove, in the county of Hardin and State of Kentucky, have invented new and useful Improvements in Headlights, of which the following is a specification.

The invention has relation to headlights designed more particularly for motor vehicles, whereby the roadway in advance of the machine may be illuminated whether the machine is traveling straight ahead or is deflected as when turning or rounding a curve with the result that accidents attributable to defective lighting up of the roadway are fully avoided.

The invention provides a headlight embodying a stationary lamp and a movable casing, such arrangement overcoming unsteadiness in the light and enabling an electric lamp to be advantageously employed since there is no necessity for making provision for turning of the electric conductors or other part supporting the lamp and as a result the electric connections are not liable to become loose or disarranged.

A further purpose of the invention is the provision of a headlight in which the casing provided with the reflector is connected with the steering mechanism to move therewith while the lamp remains stationary, the connecting means being of such a nature as to admit of the headlight being disconnected from the steering mechanism so as not to be operated during the day or when the headlight is not required for service.

The invention consists of the novel features, details of construction and combination of parts, which hereinafter will be more particularly set forth, illustrated and claimed.

In the accompanying drawings:—Figure 1 is a front view of a headlight embodying the invention showing the same applied to a motor vehicle of the automobile type. Fig. 2 is a side view. Fig. 3 is a top plan view, one of the lamps having parts omitted. Fig. 4 is an enlarged section. Fig. 5 is a detail view.

Corresponding and like parts are referred to in the following description, and indicated in all the views of the drawings, by the same reference characters.

The invention relates to headlights embodying side lamps and as shown in the accompanying drawings, such lamps are mounted upon standards 1 which are secured at their lower ends to the axle 2 or other convenient part of the vehicle. The standards 1 are made hollow so as to receive the wires 3 by means of which the current is supplied to the lamps 4 when the latter are of the electric variety. The upper ends of the standards 1 are reduced as indicated at 5, such reduced ends receiving base pieces 6 which are mounted to turn thereon, balls 7 being interposed between the lower side of each base piece 6 and the enlarged part of the standard at the base of the reduced end 5. The base piece 6 supports the lamp body or casing 8 which is secured to fork members 9 attached at their lower ends to the base piece 6. An arm 10 projects from each base piece 6 and a rod 11 connects the arms 10 to cause both base pieces 6 to turn in unison. One of the base pieces 6 is connected with the steering mechanism in such a manner as to move therewith, the connections being such as to cause the rays of light shed by the lamps to be thrown in a direction parallel with the steering wheels with the result that when the vehicle is deflected from a straight course the rays of light from the lamps are likewise deflected so as to light up the roadway in advance of the machine. An arm 12 extends rearwardly and downwardly from one of the base pieces 6 and receives a section 13 which forms an extension of such arm, said extension being adjustable on the arm and extending parallel therewith whereby the relative length of the arm 12 may be varied. A link 14 connects the section or extension 13 of the arm 12 with the drag link 15 or other part of the steering mechanism. A clamp 16 fitted to the drag link 15 has the end of the link 14 connected thereto by means of a universal joint so as to prevent any binding and enable the parts to be operated easily.

It is to be understood that when the parts are arranged and connected, as shown in the drawings, the lamps move with the steering mechanism when the vehicle is deflected from a straight course, but should it be required to have the lamps remain stationary, as during the day, the link 14 may be disconnected from the extension 13 and the parts thus disconnected may be secured in any manner. It is further noted that the lamps 4 remain stationary whereas the lamp bodies or casings 8 are movable and this arrangement insures a steady light and enables either electric or gas lamps being advantageously employed without making provision for any loose connections.

From the foregoing description, taken in connection with the accompanying drawings, the advantages of the construction and of the method of operation of the invention will be readily apparent to those skilled in the art to which the invention appertains, and while we have described the principle of operation of the invention together with the device which we now consider to be the best embodiment thereof, we desire to have it understood that the device shown is merely illustrative and that such changes may be made when desired as are within the scope of the invention as claimed.

Having thus described the invention what is claimed as new, is:—

In a headlight for vehicles, the combination of a standard, adapted for attachment to the front axle of the vehicle and extending outwardly and upwardly therefrom and having a reduced portion, such standard and reduced portion being made tubular for receiving the means whereby the light producing medium is supplied to the lamp, a lamp carried by the reduced portion of the standard and a casing for receiving the lamp and mounted upon the reduced part of the standard to turn thereon.

In testimony whereof we affix our signatures in presence of two witnesses.

JOHN R. DAVIS.
ULLIE M. RICHARDSON.

Witnesses:
FRANK HOWELL,
FRANK L. WOODRING.